US012792936B2

(12) United States Patent
Gupta et al.

(10) Patent No.: US 12,792,936 B2
(45) Date of Patent: Nov. 10, 2026

(54) UNSTRUCTURED DATA EXTRACTION WITH LARGE LANGUAGE MODELS FOR QUERY RESOLUTION

(71) Applicant: Palo Alto Networks, Inc., Santa Clara, CA (US)

(72) Inventors: Puneet Gupta, Bengaluru (IN); Nandini Ramanan, Sunnyvale, CA (US); Ramesh Nampelly, Livermore, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 192 days.

(21) Appl. No.: 18/648,539

(22) Filed: Apr. 29, 2024

(65) Prior Publication Data

US 2025/0335795 A1 Oct. 30, 2025

(51) Int. Cl.
*G06N 5/04* (2023.01)
*G06N 5/022* (2023.01)

(52) U.S. Cl.
CPC ............... *G06N 5/04* (2013.01); *G06N 5/022* (2013.01)

(58) Field of Classification Search
None
See application file for complete search history.

(56) References Cited

U.S. PATENT DOCUMENTS 12,001,801 B2 * 6/2024 Wang et al. ........ G06F 16/3329
2024/0070150 A1 * 2/2024 Nahamoo et al. ....... G06F 16/93
2024/0311407 A1 * 9/2024 Barron et al. ....... G06F 16/3344
2025/0131121 A1 * 4/2025 Teng et al. .............. G10L 15/30

OTHER PUBLICATIONS

Beck, et al., "Intro to Automated Question Answering", [online], [retrieved on Apr. 23, 2024] Retrieved from the Internet: <https://qa.fastforwardlabs.com/methods/background/2020/04/28/Intro-to-QA.html#information-retrieval-based-systems-retrievers-and-readers>, Apr. 28, 2020.

Lindenberg, "Things, not strings: Knowledge graphs for investigative reporting", [online], [retrieved on Apr. 23, 2024] Retrieved from the Internet: <https://medium.com/occrp-unreported/things-not-strings-knowledge-graphs-for-investigative-reporting-9d8a26913f65>, Jul. 11, 2020.

Mashette, "Building a Document-based Question Answering System with LangChain using LLM model", [online], [retrieved on Apr. 26, 2024Retrieved from the Internet: <https://medium.com/@nageshmashette32/building-a-document-based-question-answering-system-with-langchain-using-llm-model-fb22e47a965c>, Jun. 18, 2023.

* cited by examiner

*Primary Examiner* — Paras D Shah
*Assistant Examiner* — Nicholas D Lowen
(74) *Attorney, Agent, or Firm* — Gilliam IP PLLC

(57) ABSTRACT

An unstructured data query-response pair generation system (generation system) populates a knowledge base of query-response pairs for queries of natural language content in unstructured data by prompting a first large language model (LLM) text extracted from the unstructured data. An unstructured data chatbot (chatbot) leverages the knowledge base by augmenting prompts to a second LLM responding to user queries for natural language content in the unstructured data with query-response pairs having queries that are semantically similar to the user queries. The knowledge base and LLMs are updated based on user feedback correcting responses, continually improving quality of the generation system and chatbot.

20 Claims, 8 Drawing Sheets

UNSTRUCTURED DATA EXTRACTION WITH LARGE LANGUAGE MODELS FOR QUERY RESOLUTION

BACKGROUND

The disclosure generally relates to data processing (e.g., CPC subclass G06F) and to computing arrangements based on specific computational models (e.g., CPC subclass G06N).

Chatbots are commonly employed to provide automated assistance to users by simulating human conversation via chat-based interactions. Example use cases for chatbots include handling customer inquiries, automating tasks, providing information, and delivering recommendations. Chatbots are increasingly implemented using artificial intelligence (AI) to handle and respond to natural language inputs from users, with implementations rapidly adopting generative AI for text generation.

Large language models (LLMs) are implemented as chatbots to respond to user queries based on prompts generated from engineered templates. For LLMs, the meaning of model training has expanded to encompass pre-training and fine-tuning. In pre-training, the LLM is trained on a large training dataset for the general task of generating an output sequence based on predicting a next sequence of tokens. In fine-tuning, various techniques are used to fine-tune the training of the pre-trained LLM to a particular task. For instance, a training dataset of examples that pair prompts and responses/predictions are input into a pre-trained LLM to fine-tune it. Prompt-tuning and prompt engineering of LLMs have also been introduced as lightweight alternatives to fine-tuning. Prompt engineering can be leveraged when a smaller dataset is available for tailoring an LLM to a particular task (e.g., via few-shot prompting) or when limited computing resources are available. In prompt engineering, additional context may be fed to the LLM in prompts that guide the LLM as to the desired outputs for the task without retraining the entire LLM.

Retrieval-augmented generation (RAG) is a technique that boosts data inputs to LLMs by retrieving data outside the scope of raw inputs (e.g., user queries) to the LLMs, for instance by accessing external databases or other data sources. RAG can be used to improve generated prompts by inserting the boosted data into engineered prompt templates.

BRIEF DESCRIPTION OF THE DRAWINGS

Embodiments of the disclosure may be better understood by referencing the accompanying drawings.

DESCRIPTION

Figure 1:
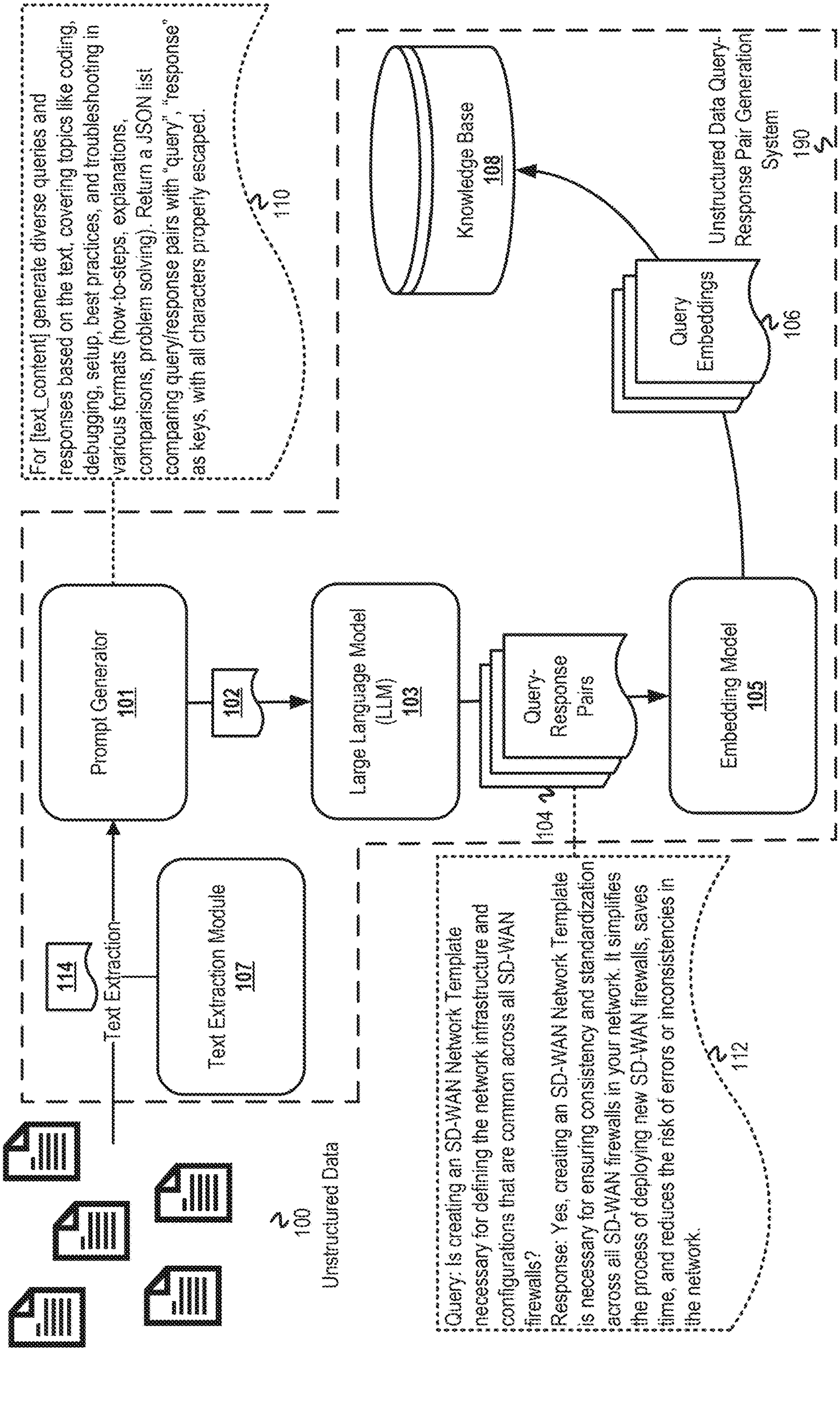
FIG. 1 is a schematic diagram of an example system for populating a knowledge base with query-response pairs for unstructured data using an LLM.

The description that follows includes example systems, methods, techniques, and program flows to aid in understanding the disclosure and not to limit claim scope. Well-known instruction instances, protocols, structures, and techniques have not been shown in detail for conciseness.

Overview

Data mining of unstructured data for user query resolution poses a challenge because relevant data to a user query can be stored at multiple, disparate memory locations and the unstructured data may not have metadata or other indicators that correlate these multiple memory locations. Simply ingesting one section of unstructured data is often insufficient for responding to a user query, even if the relevant data to the user query is contained in that section, because a model may not be able to identify the relevant data without additional structure. Existing approaches either rely on generating embeddings of chunks of unstructured data and retrieving most relevant chunks to a query, which loses overall context, or leveraging knowledge graphs when responding to queries, which is both challenging and time consuming to maintain and relies on structure that is not present in unstructured data. The present disclosure leverages LLMs that synthesize unstructured data into query-response pairs to inform a chatbot when responding to user queries regarding natural language content in the unstructured data.

In an offline data preparation phase, a first LLM receives unstructured data, broken into sections (e.g., sections in a table of contents, table entries or other visual delineations, etc.) when applicable, and is instructed to generate numerous query-response pairs for potential user queries regarding the unstructured data. An embedding model generates natural language processing (NLP) embeddings of the query-response pairs that are stored in a knowledge base. In a second online query response phase, based on indications of a user query from a user, the knowledge base searches for query-response pairs having queries that are semantically similar to the user query. A second LLM is instructed to respond to the user query based on context provided by similar query-response pairs.

When the user receives a response from the second LLM, the user has the option of providing feedback to a feedback/evaluation system. The feedback/evaluation system enters a feedback loop with the user, using the second LLM to generate updated responses based on user feedback until the user agrees that a response is correct or until failure. The feedback/evaluation system also has the capability of evaluating the second LLM using meta queries comprising multiple choice questions across potentially multiple contexts of the unstructured data to evaluate and update the second LLM.

Using the first LLM as a preprocessing step to populate the knowledge base with query-response pairs effectively synthesizes context for the unstructured data. This allows the second LLM to generate accurate responses to user queries regarding natural language content in the unstructured data that can incorporate multiple data locations within the unstructured data. Moreover, storing the unstructured data as query-response pairs reduces storage space allocated to the unstructured data. The second LLM can be a lightweight LLM to reduce usage of computing resources in addition to the storage reduction from synthesizing the unstructured data as query-response pairs.

Example Illustrations

FIG. 1 is a schematic diagram of an example system for populating a knowledge base with query-response pairs for unstructured data and an LLM. An unstructured data query-response pair generation system 190 comprises a text extraction module 107, a prompt generator 101, an LLM 103, an embedding model 105, and a knowledge base 108. The text extraction module 107 extracts text 114 from unstructured data 100. The prompt generator 101 generates one or more prompts 102 from the text 114 that instruct an LLM 103 to generate query-response pairs 104 based on the text 114. The embedding model 105 generates query embeddings 106 for the query-response pairs 104 that are stored in the knowledge base 108 indexed by the query embeddings 106.

The unstructured data 100 can comprise Portable Document Format (PDF) files, DOC files, web pages, image/audio/video/text files, PowerPoint® presentations, customer service emails, system logs, audio transcripts from customer calls, technical manuals, or any data stored in data formats that do not have a data model or other context-based organizational structure. The text extraction module 107 can extract text according to indexes or sections in the unstructured data sources 100 (e.g., table of contents, table entries, etc.), and the text 114 can comprise indications of each section. The unstructured data 100 can comprise data at a scope of unstructured data for which user queries are expected, for instance documentation for a product/service, documentation for products/services deployed a vendor/organization, etc. The prompt generator 101 can periodically generate additional prompts for the LLM 103 for additional unstructured data as that unstructured data is detected for the scope of user queries (e.g., as documentation is added/updated for products/services of a vendor/organization).

Example prompt template 110 for generating prompts to the LLM 103 comprises the following text:

For [text_content], generate diverse queries and responses based on the text, covering topics like coding, debugging, setup, best practices, and troubleshooting in various formats (how-to-steps, explanations, comparisons, problem solving). Return a JSON list comparing query-response pairs with "query", "response" as keys, with all characters properly escaped.

"[text_content]" is a placeholder field to insert the text 114 extracted from the unstructured data 100. The example prompt template 110 provides example topics for unstructured data relating to software/hardware products. For other types of unstructured data, the one or more prompts 102 can include different example topics. For instance, when the unstructured data describes a sales product, an example topic can comprise sales opportunity stages. When the text 114 causes the one or more prompts 102 to exceed a threshold input length for the LLM 103, the prompt generator 101 can split the one or more prompts 102 into multiple prompts and include indications of the multiple prompts as instructions in the one or more prompts 102.

A type of the LLM 103 can vary depending on computing resources available for populating the knowledge base 108. For instance, when a high amount of computing resources is available, the LLM 103 can comprise a GPT-4® LLM. In some embodiments, the LLM 103 can be fine-tuned (e.g., with one-shot or few-shot prompting) with context of the unstructured data 100 to guide generation of query-response pairs.

Example query-response pair 112 generated by the LLM 103 comprises the following text:

Query: Is creating an SD-WAN Network Template necessary for defining the network infrastructure and configurations that are common across all SD-WAN firewalls? Response: Yes, creating an SD-WAN Network Template is necessary for ensuring consistency and standardization across all SD-WAN firewalls in your network. It simplifies the process of deploying new SD-WAN firewalls, saves time, and reduces the risk of errors or inconsistencies in the network.

The example query-response pair 112 is for a cybersecurity networking product(s). A corresponding prompt to the LLM 103 would instruct generating query-response pairs relating to a cybersecurity networking product(s) and include example topics such as network infrastructure and network configuration of firewalls.

The embedding model 105 receives query-response pairs 104 obtained as output from prompting the LLM 103 with the one or more prompts 102 and generates query embeddings 106. The query embeddings 106 comprise NLP embeddings (e.g., word2vec embeddings, doc2vec embeddings, LLM embeddings, etc.) of queries in the query-response pairs 104 that preserve semantic similarity. These NLP embeddings can, in some embodiments, additionally comprise a separate embedding for each query and response, an embedding of each query and each query-response pair or any other embeddings that allow for semantic similarity search between any two queries and between any two query-response pairs. The embedding model 105 then communicates the query embeddings 106 to the knowledge base 108 for storage. The knowledge base 108 can be indexed by query and/or response embeddings for efficient retrieval of embeddings semantically similar to a user query or given query-response pair. The knowledge base 108 stores the query embeddings 106 in association with corresponding ones of the query-response pairs 104. The knowledge base 108 can be a vector database (wherein the vectors are the query embeddings 106) for efficient storage and retrieval.

Figure 2:
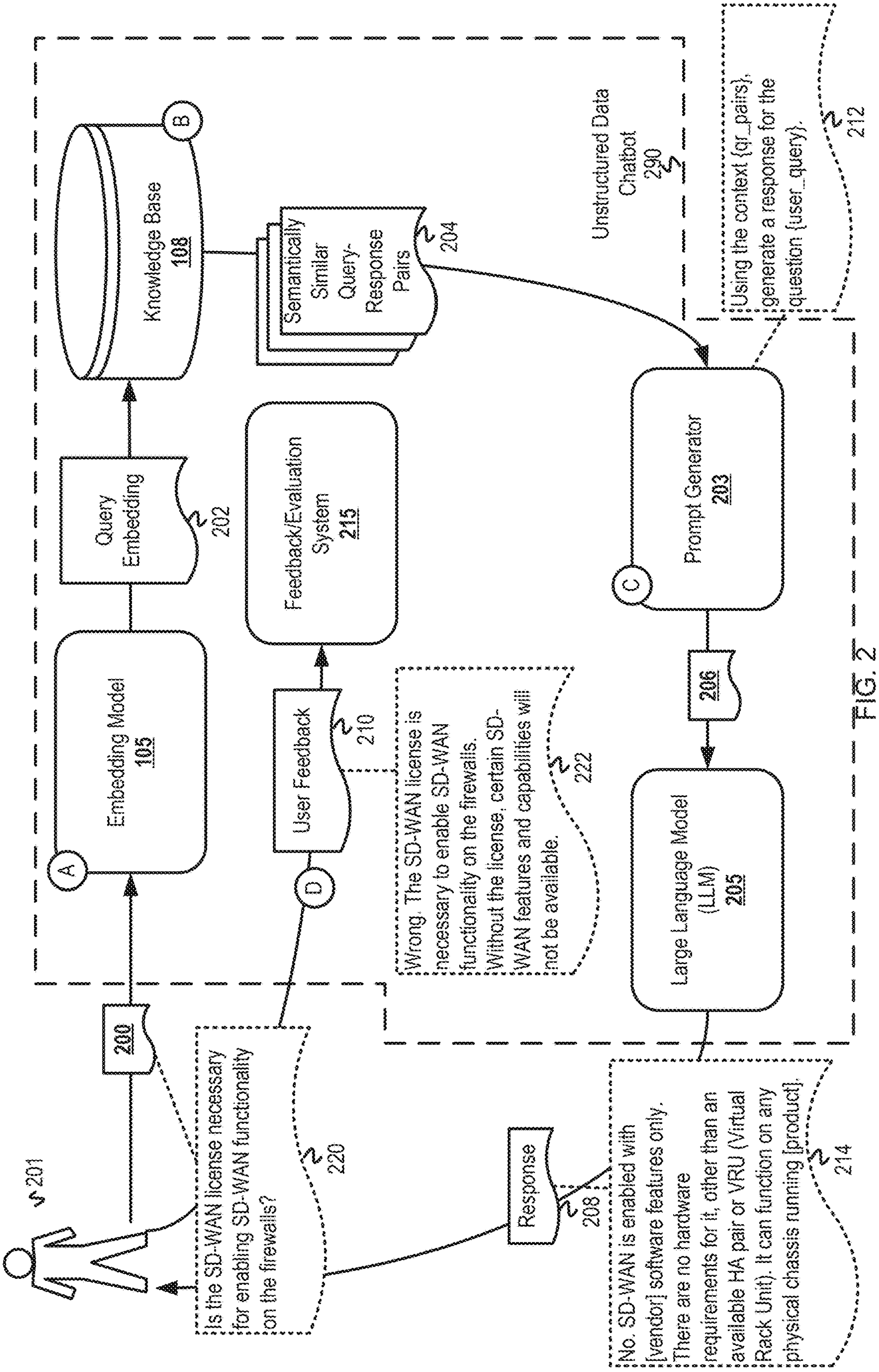
FIG. 2 is a schematic diagram of an example system for responding to a user query regarding unstructured data using a knowledge base populated with query-response pairs for the unstructured data and an LLM.

FIG. 2 is a schematic diagram of an example system for responding to a user query regarding unstructured data using a knowledge base populated with query-response pairs for the unstructured data and an LLM. The knowledge base 108 depicted in FIG. 2 is the same knowledge base that was populated with query-response pairs as described in reference to FIG. 1. The embedding model 105 was used to generate embeddings stored in the knowledge base 108 as described in reference to FIG. 1. An unstructured data chatbot 290 for responding to user queries for natural language content in unstructured data comprises the embedding model 105, the knowledge base 108, a prompt generator 203, and an LLM 205.

FIG. 2 is annotated with a series of letters A-D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the embedding model 105 receives a user query 200 from a user 201 and generates a query embedding 202 of the user query 200. Example user query 220 comprises the following text:

Is the SD-WAN license necessary for enabling SD-WAN functionality on the firewalls? The query embedding 202 comprises the same type of NLP embedding used when populating the knowledge base 108 with query-response pairs and corresponding query embeddings.

At stage B, the knowledge base 108 receives the query embedding 202 and retrieves semantically similar query-response pairs 204 having queries with highest semantic similarity to the query embedding 202. For instance, the knowledge base 108 can search for query-response pairs having queries with embeddings that are within a threshold distance of the query embedding 202, top-N query-response pairs by similarity of query embeddings to the query embedding 202 (e.g., N=5), a combination of both these criteria, etc. In some embodiments, when there are no query-response pairs in the knowledge base 108 that are semantically similar to the query embedding 202 according to the criteria used, the knowledge base 108 can communicate a response to the user 201 indicating that there is no available response to the query. The communicated response can additionally navigate the user to a web page or other data source where the unstructured data that may be relevant to the user query 200 is located, or an interface with an expert for resolution of the user query 200.

At stage C, the prompt generator 203 receives the semantically similar query-response pairs 204 and generates a prompt 206 to the LLM 205 that instructs the LLM 205 to respond to the user query 200 using context described by the query-response pairs 204. Example prompt template 212 for prompts to the LLM 205 comprises the following text:

Using the context {qr_pairs}, generate a response for the question {user_query}.

The prompt 206 can additionally comprise instructions such as an amount of randomness to use when generating responses, details for products/services associated with unstructured data related to the user query 200, etc.

The prompt generator 203 prompts the LLM 205 with the prompt 206 to obtain a response 208 to the user 201 as output. Example response 214 to the example user query 200 comprises the following text:

No. SD-WAN is enabled [vendor] software features only. There are no hardware requirements for it, other than an available HA pair or VRU (Virtual Rack Unit). It can function on any physical chassis running [product].

For efficiency, the LLM 205 can comprise a lightweight LLM such as a Mistral 7B LLM or other quantized LLM.

At stage D, if the user 201 determines that the response 208 to the user query 200 is incorrect, the user 201 has the option to submit user feedback 210 (e.g., via a user interface (UI) element of a UI through which the user 201 submits queries) to a feedback/evaluation system 215. Example user feedback 222 comprises the following text:

Wrong. The SD-WAN license is necessary to enable SD-WAN functionality on the firewalls. Without the license, certain SD-WAN features and capabilities will not be available.

The feedback/evaluation system 215 engages in a feedback loop with the user 201 to correct the response provided to the user 201, update the knowledge base 108 based on the corrected response, and evaluate and update the LLM 205 accordingly. Operations for feedback and evaluation by the feedback/evaluation system 215 are described in greater detail in reference to FIG. 3 below.

Figure 3:
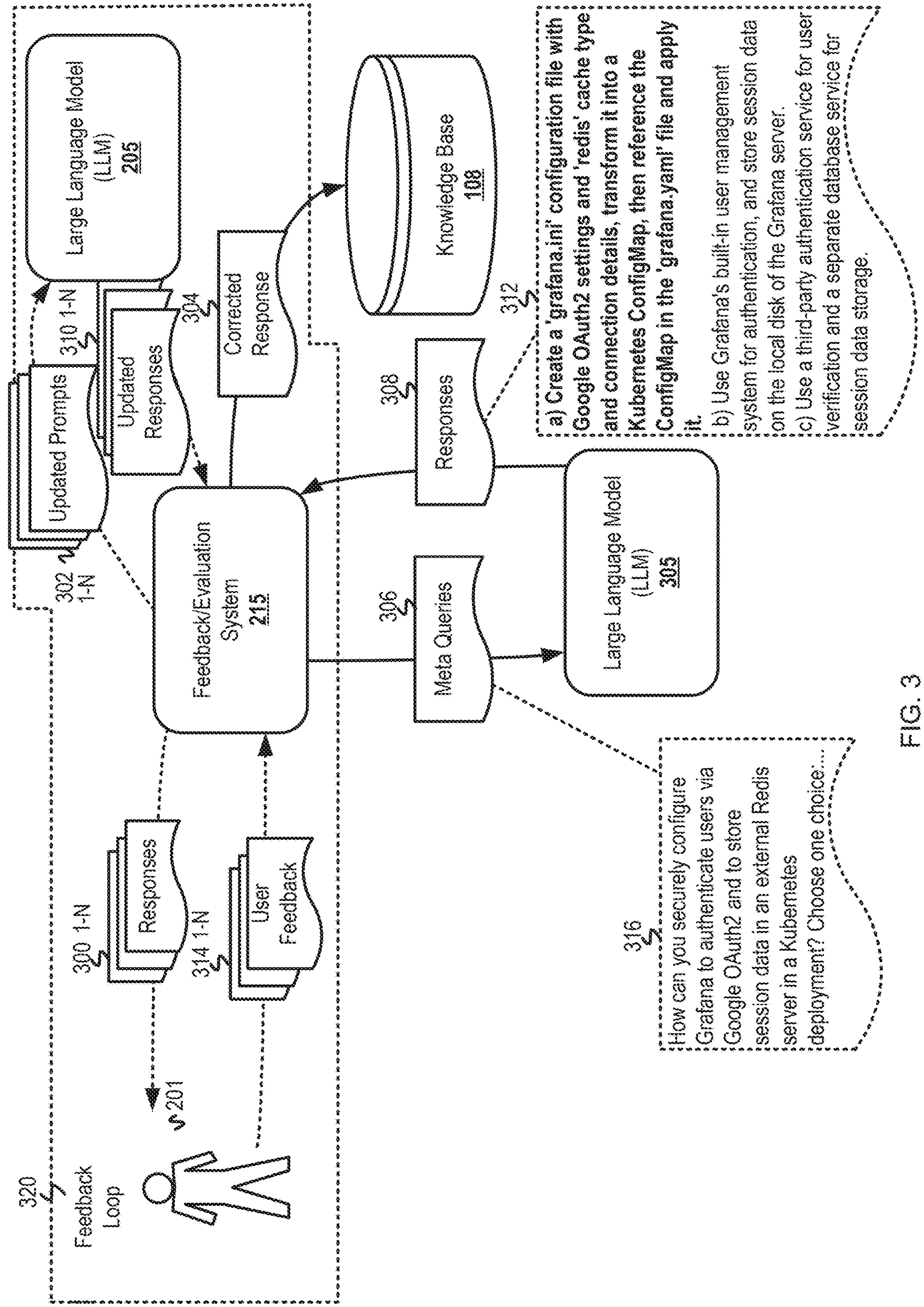
FIG. 3 is a schematic diagram of an example feedback/evaluation system for improving quality of a knowledge base of query-response pairs of unstructured data based on user feedback and LLMs that respond to queries for the unstructured data.

FIG. 3 is a schematic diagram of an example feedback/evaluation system for improving quality of a knowledge base of query-response pairs of unstructured data based on user feedback and LLMs that respond to queries for the unstructured data. FIG. 3 makes reference to the user 201, the feedback/evaluation system 215, and the LLM 205 from FIG. 2 and the knowledge base 108 from FIG. 1.

A feedback loop 320 comprises N iterations each corresponding to a response in responses 300 1-N communicated to the user 201, user feedback in user feedback 314 1-N communicated by the user 201 to the feedback/evaluation system 215, an updated prompt in updated prompts 302 1-N communicated by the feedback/evaluation system 215 to the LLM 205, and an updated response in updated responses 310 1-N communicated by the LLM 205 to the feedback/evaluation system 215 and eventually to the user 201 in the subsequent iteration. For each of the user feedback 314 1-N, a corresponding updated prompt in the updated prompts 302 1-N instructs the LLM 205 to correct a corresponding response in the response 300 1-N based on the user feedback at the current iteration. The feedback/evaluation system 215 prompts the LLM 205 with the updated prompt in the updated prompts 302 1-N and receives an updated response in the updated responses 310 1-N as output from the LLM 205. The feedback/evaluation system 215 communicates the updated response in the updated responses 310 1-N to the user 201 for an additional iteration of the feedback loop 320.

The process of generating updated responses for the user 201 continues in iterations of the feedback loop 320 with the user 201 providing further feedback to generate additional updated responses at each iteration until the user 201 determines that a response in the responses 300 1-N is correct (success condition for the feedback loop 320) or termination criteria are satisfied (failure condition for the feedback loop 320). The termination criteria can comprise that a threshold number of iterations of the feedback loop 320 have occurred, that a threshold time period since the feedback loop 320 started has expired, etc.

In the case of failure of the feedback loop 320, the feedback/evaluation system 215 communicates a response to the user 201 that indicates no response was able to be generated to a corresponding query by the user. The response can additionally navigate the user to a web page or other resource to facilitate resolving the user query. In the case of success, the feedback/evaluation system 215 communicates corrected response 304 verified as corrected by the user 201 during the feedback loop 320 to the knowledge base 108 for updating and/or adding an entry. The corrected response 304 additionally comprises the query by the user 201. The knowledge base 108 (or other component) generates an embedding of the user query and searches for query-response pairs with semantically similar query embeddings. If there is a query-response pair with a sufficient semantically similar query embedding (e.g., according to a threshold), the knowledge base 108 replaces an entry for that query-response pair with an entry for the corrected response 304 including the user query and the corresponding query embedding. Otherwise, the knowledge base 108 adds an entry comprising the corrected response 304 and the corresponding user query and query embedding.

The feedback/evaluation system 215 also has the capability of evaluating performance of LLMs such as LLM 305 using meta queries (this is depicted as a separate LLM from the LLM 205 in FIG. 3 for clarity of presentation; in practice the LLM 305 can be any LLM responding to user queries for unstructured data such as the LLM 205). The feedback/evaluation system 215 communicates meta queries 306 to the LLM 305 and receives responses 308 to the meta queries 306. Each of the meta queries 306 is an engineered query (e.g., engineered by a domain-level expert) generated based on query-response pairs stored in the knowledge base 108. More specifically, the meta queries 306 comprise queries for natural language content that are answered by context of responses stored in the knowledge base 108, possibly across multiple contexts/responses. Each of the meta queries 306 has a multiple-choice answer and prompts the LLM 305 to pick one of the choices, which allows for an evaluation of the LLM 305 according to percentage of multiple-choice questions answered correctly rather than relying on exact or approximate text matches of responses provided by the LLM 305.

Example meta query 316 comprises the following text:

How can you securely configure Grafana to authenticate users via Google OAuth2 and to store session data in an external Redis server in a Kubernetes deployment? Choose one choice: . . .

The example meta query 316 additionally comprises multiple-choice responses to this question. Example response 312 to the example meta query 316 comprises the following text (with answer choice (a) in bold to indicate this choice was made by the LLM 305):

a) Create a 'grafana.ini' configuration file with Google OAuth2 settings and 'redis' cache type and connection details, transform it into a Kubernetes ConfigMap, then reference the ConfigMap in the 'grafana.yaml' file and apply it.

b) Use Grafana's built-in user management system for authentication, and store session data on the local disk of the Grafana server.

c) Use a third-party authentication service for user verification and a separate database service for session data storage.

The example meta query 316 is a query for natural language content across multiple contexts for responses to user queries, notably user authentication via Google OAuth2 and storage of session data in external Redis servers of a Kubernetes deployment. Such meta queries test the ability of the LLM 305 to synthesize multiple contexts using question response pairs of unstructured data. The feedback/evaluation system 215 evaluates the LLM 305 based on percentage of correct choices made in the responses 308 to the meta queries 306. When the percentage of correct choices is sufficiently low, the feedback/evaluation system 215 can update the LLM 305 by tuning parameters such as a temperature parameter, by fine tuning the LLM 305 with context of unstructured data, by replacing the LLM 305 with a different (possible larger) LLM, etc.

The feedback/evaluation system 215 can additionally adjust a temperature parameter for the LLM 205 based on success or failure of the feedback loop 320 and based on percentage correctness of the evaluation with the meta queries 306. The temperature parameter determines a level of randomness in responses by the LLM 205. If the feedback loop 320 fails, the LLM 205 can increase the temperature parameter to increase the randomness in responses by output by the LLM 205, allowing for more creative/diverse responses that were not able to be provided during the feedback loop 320. Conversely, if the feedback loop 320 succeeds, the LLM 205 can decrease the temperature parameter to make the responses by the LLM 205 more deterministic based on quality of responses provided by the LLM 205 during the feedback loop 320. Adjustment of the temperature parameter can occur based on success/failure statistics of the feedback loop 320 across multiple user queries to get a larger picture of overall performance by the LLM 205.

FIGS. 4-7 are flowcharts of example operations for populating a knowledge base with query-response pairs for natural language content of unstructured data using a first LLM, responding to user queries for natural language content in the unstructured data using the knowledge base and a second LLM, and evaluating and updating the knowledge base and the second LLM based on user feedback and meta questions. The example operations are described with reference to an unstructured data query-response pair generation system ("generation system"), an unstructured data chatbot ("chatbot"), and a feedback/evaluation system for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
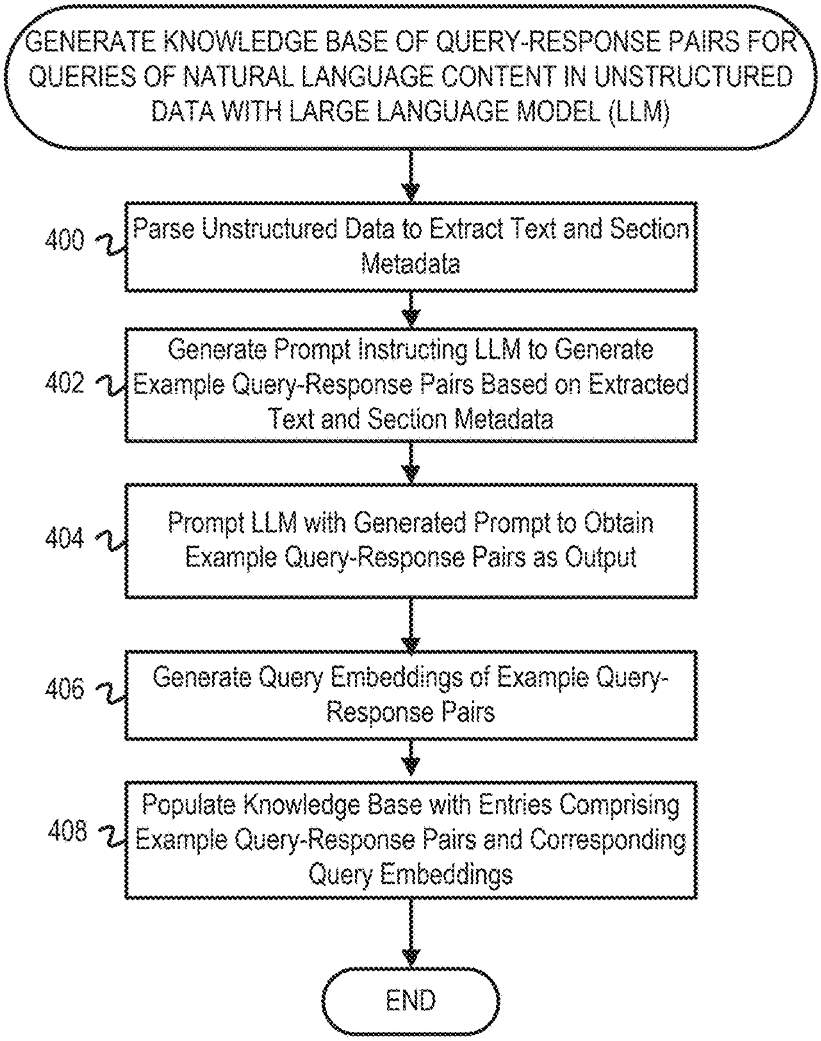
FIG. 4 is a flowchart of example operations for generating a knowledge base of query-response pairs for queries of natural language content in unstructured data with an LLM.

FIG. 4 is a flowchart of example operations for generating a knowledge base of query-response pairs for queries of natural language content in unstructured data with an LLM. At block 400, the generation system parses unstructured data to extract text and section metadata. The unstructured data can comprise data in PDF documents, DOC files, image/video/audio/text files, etc. The scope of the unstructured data corresponds to a scope of queries which are expected to be received from users, for instance documentation for software as a service (SaaS) applications or other products distributed to users with an associated chatbot. An off-the-shelf unstructured data parsing tool can be used to parse the unstructured data to extract text. The section metadata can comprise both metadata for sections such as section headers and indications of each section of extracted text. As examples, metadata can indicate sections of text and a reason for those sections are grouped, for instance that the sections of text are within visual elements such as table entries, and that sections of text are within organizational elements as tables of contents.

At block 402, the generation system generates a prompt instructing the LLM to generate example query-response pairs based on the extracted text and section metadata. The prompt indicates task instructions that the LLM should generate diverse query-response pairs based on the extracted text and corresponding section metadata. The prompt is generated using an engineered prompt template with placeholder fields for inserting the extracted text and section metadata. The prompt template can comprise instructions that are directed at responding to queries for the scope of the unstructured data. For instance, the prompt template can comprise example topics for responses such as debugging, setup, best practices, troubleshooting, etc. for a SaaS application. The prompt template can additionally specify a format for the query-response pairs (e.g., a JavaScript® Object Notation file) to be stored in a knowledge base. In some embodiments, the prompt template specifies an overview of products associated with the unstructured data for which queries may be asked. When the extracted text/section metadata exceeds a threshold length, the generation system can split the prompt into multiple prompts that fit an input size of the LLM.

At block 404, the generation system prompts the LLM with the generated prompt to obtain example query-response pairs as output. The prompt can specify a number of example query-response pairs to be generated by the LLM that depends on, for instance, the amount of extracted text used in the prompt, the diversity of unstructured data, etc. The LLM can comprise an off-the-shelf LLM such as a GPT-4 LLM and can, in some embodiments, be fined tuned to context of the unstructured data, for instance by prompting the LLM with an initial prompt describing products and/or other entities associated with the unstructured data.

At block 406, the generation system generates query embeddings of the example query response. For instance, the generation system can generate word2vec embeddings, doc2vec embeddings, LLM embeddings, or other NLP embeddings of queries for each query-response pair that preserve semantic similarity. Depending on implementation, the embeddings can additionally comprise separate embeddings of each query and response and/or embeddings of each query and response combined.

At block 408, the generation system populates a knowledge base with entries comprising the example query-response pairs and corresponding query embeddings. For instance, the knowledge base can comprise a vector database and each query-response pair can be stored as the natural language query-response pair (i.e., prior to generating a semantic embedding) indexed by the corresponding query embedding. The vector database can maintain an index for semantic search by query.

Figure 5:
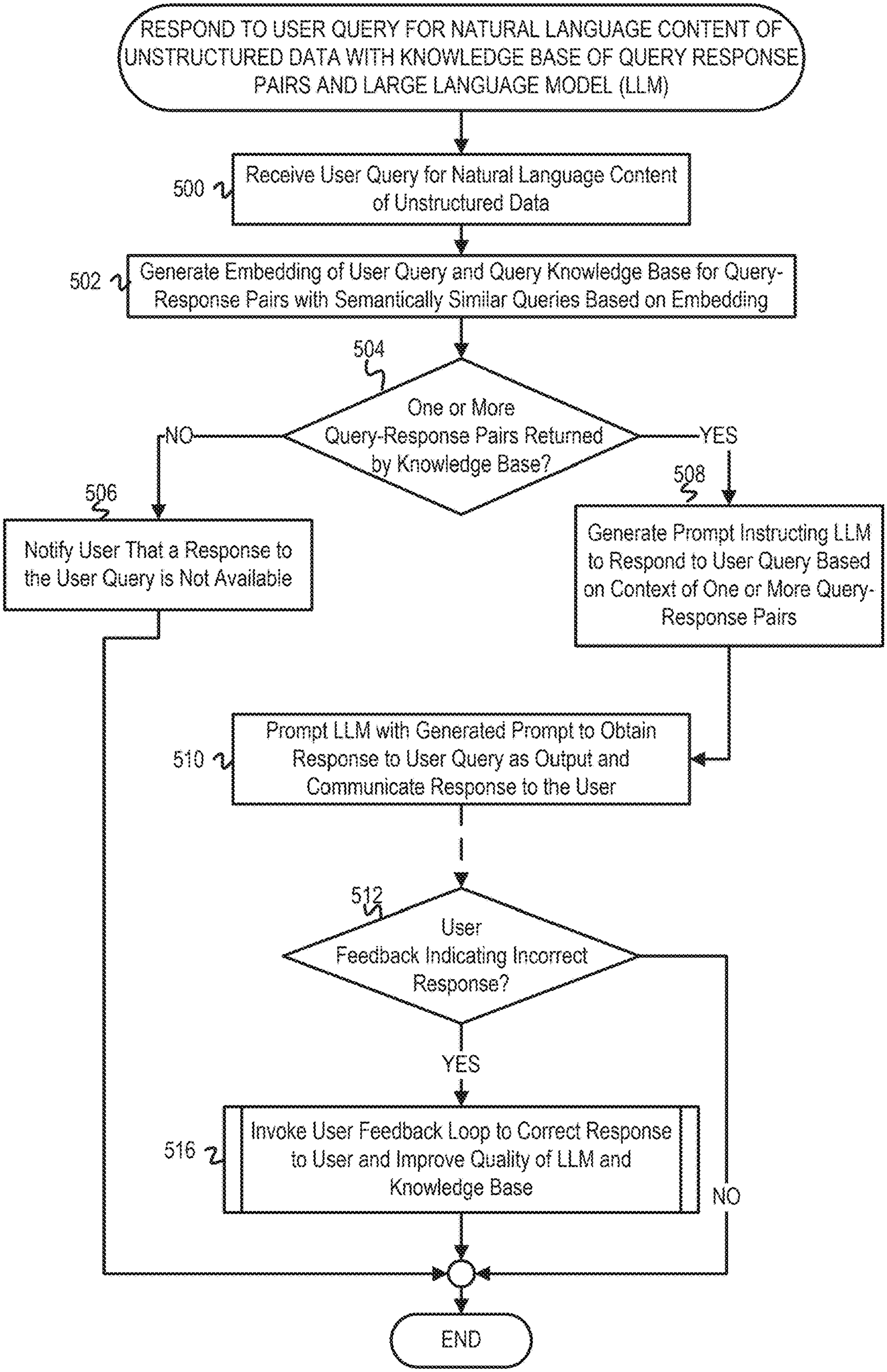
FIG. 5 is a flowchart of example operations for responding to a user query for natural language content of unstructured data with a knowledge base of query-response pairs and an LLM.

FIG. 5 is a flowchart of example operations for responding to a user query for natural language content of unstructured data with a knowledge base of query-response pairs and an LLM. The knowledge base of query-response pairs has previously been populated with query-response pairs for natural language content of the unstructured data in a database that can be semantically searched by query.

At block 500, the chatbot receives a user query for natural language content in the unstructured data. The user query can be received via a user interface for a tool/service running on an endpoint device of the user. In some instances, the tool/service can be integrated into a product(s) associated with the unstructured data, e.g., as a browser extension or integrated chatbot in a web page for a SaaS application.

At block 502, the chatbot invokes an embedding model to generate an embedding of the user query and queries the knowledge base for query-response pairs with semantically similar queries based on the embedding. The embedding of the user query is a same type of semantic embedding used to populate query-response pairs in the knowledge base. The query to the knowledge base can specify a threshold number of response query pairs to return and/or a threshold semantic similarity between the user query and corresponding queries in the query-response pairs to return.

At block 504, the chatbot determines whether the knowledge base returned one or more query-response pairs (e.g., whether there were any query-response pairs corresponding to queries having semantic similarity to the user query above a threshold semantic similarity). If one or more query-response pairs were returned by the knowledge base, operational flow proceeds to block 508. Otherwise, operational flow proceeds to block 506.

At block 506, the chatbot notifies the user that a response to the user query is not available. The chatbot can additionally navigate the user to a troubleshooting service that facilitates resolving the user query such as a web page, document, or communication channel with a domain-level expert. The navigation can comprise providing the user with a hyperlink to the web page, the document, the communication channel, etc., or can be a built in functionality of a SaaS application or other product providing the chatbot. The operational flow in FIG. 5 terminates from block 506.

At block 508, the chatbot generates a prompt instructing the LLM to respond to the user query based on context of the one or more query-response pairs. The generated prompt comprises a query-response pair returned by the knowledge base having a query most semantically similar to the user query (in some embodiments, the prompt can comprise all of the one or more query-response pairs instead) and task instructions to generate a response to the user query based on context provided by the one or more query-response pairs. The generated prompt can additionally specify a temperature parameter that indicates a level of randomness in generating a response to the user query, for instance as task instructions in the prompt or as a configurable parameter of the LLM itself. A lower temperature value means the responses provided by the LLM are more deterministic, whereas a higher temperature value means the responses provided by the LLM have more variability and may, in some cases, provide more creative and/or diverse answers when warranted by the unstructured data. Although described as comprising the most semantically similar query-response pair, in other embodiments the generated prompt can comprise multiple or all of the one or more query-response pairs returned by the knowledge base.

At block 510, the chatbot prompts the LLM with the generated prompt to obtain a response to the user query as output and communicates the response to the user. At block 512, the feedback/evaluation system determines whether the user provides feedback indicating that the response communicated to the user is incorrect. A dashed line is depicted from block 510 to block 512 to represent the asynchronous flow from the chatbot communicating the response and receiving feedback, if any. If no feedback is received (e.g., before a defined timeout) or feedback is received that indicates that the response is correct, then the operational flow in FIG. 5 terminates. If feedback is received and the feedback indicates that the response communicated to the user is incorrect, then operational flow proceeds to block 516.

At block 516, the feedback/evaluation system invokes a user feedback loop that continues the conversation (or interacting) with the user to correct the response to the user and improve quality of the LLM and the knowledge base. The feedback loop is an iterative loop of updating the response to the user and the user determining whether the updated response is correct, either until termination criteria are satisfied (failure) or the user determines that the response is correct (success). The operations at block 516 are described in greater detail in reference to FIG. 6.

Figure 6:
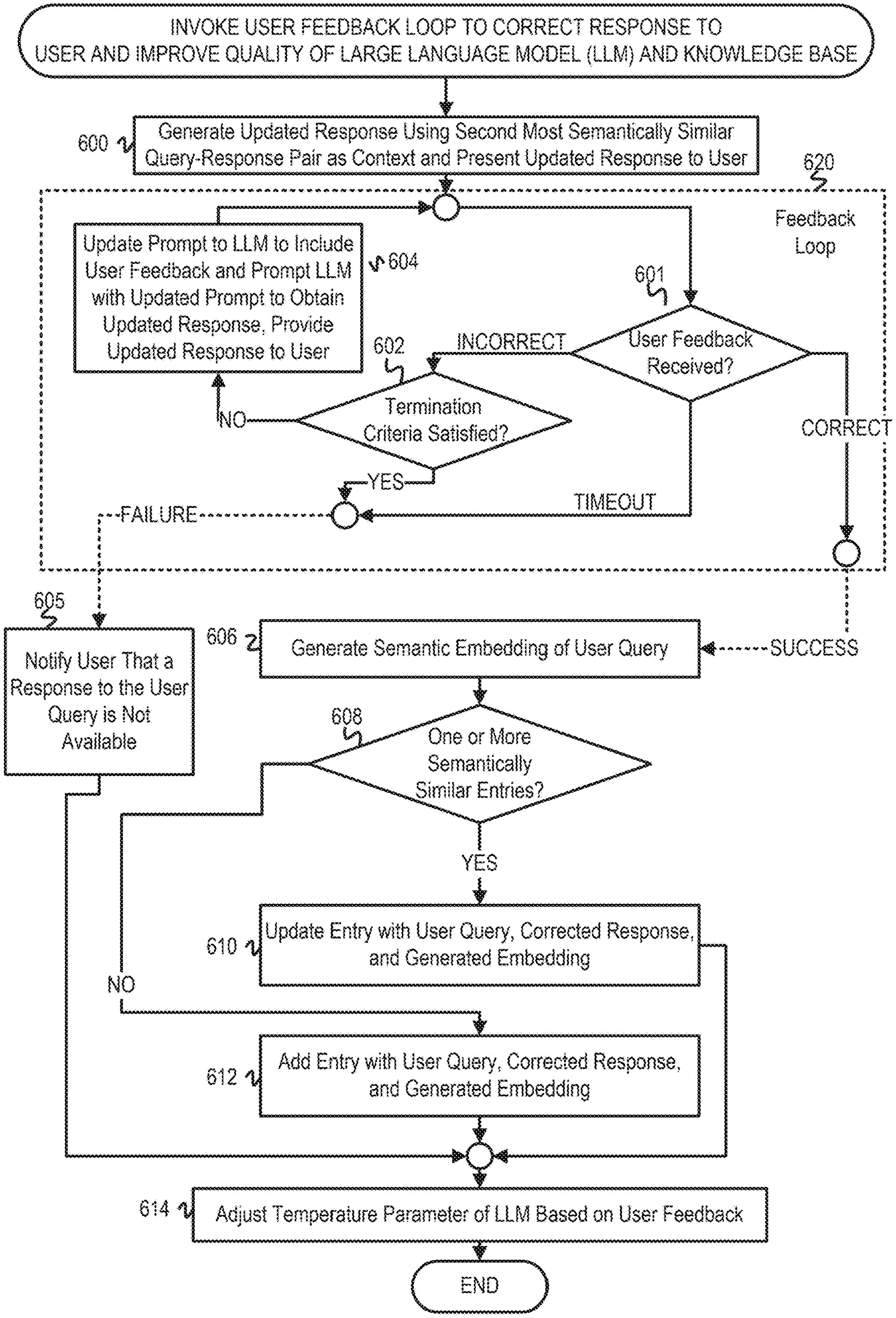
FIG. 6 is a flowchart of example operations for invoking a user feedback loop to correct a response to a user and improve quality of an LLM and a knowledge base accordingly.

FIG. 6 is a flowchart of example operations for invoking a user feedback loop to correct a response to a user and improve quality of an LLM and a knowledge base accordingly. The LLM is the LLM that was used to generate the response using example query-response pairs in the knowledge base. The response is assumed to have been generated based on a query-response pair from one or more query-response pairs in the knowledge base having corresponding queries most semantically similar to the user query.

At block 600, the feedback/evaluation system generates an updated response to the user using the second most semantically similar query-response pair (based on semantic similarity of the corresponding query to the user query) as context and presents the updated response to the user. In some embodiments, for instance when the knowledge base only has one semantically similar query-response pair in storage, this step can be omitted and the feedback/evaluation system can proceed with a feedback loop 620, in this instance skipping blocks 601 and 602 and proceeding directly to block 604 The feedback/evaluation system can generate the updated response by generating a prompt for the LLM and prompting the LLM using operations substantially similar to the operations described at block 508 and 510 in reference to FIG. 5.

At block 601, the feedback/evaluation system determines whether user feedback is received via a UI before a timeout expires. If the feedback/evaluation system receives user feedback that the updated response is correct, operational flow skips to block 606 corresponding to success of the feedback loop 620. If the feedback/evaluation system receives user feedback that the response is incorrect, operational flow proceeds to block 602. The feedback/evaluation system can comprise a natural language component that determines whether user feedback indicates a correct or incorrect response or can provide the user with an option to specify whether the updated response is correct or incorrect. If a timeout occurs while the feedback/evaluation system waits for user feedback, operational flow proceeds to block 605 corresponding to a failure of the feedback loop 620. In other embodiments, if the feedback/evaluation system does not receive user feedback and a timeout occurs, the feedback/evaluation system can omit the remaining operations in FIG. 6.

At block 602, the feedback/evaluation system determines whether termination criteria for the feedback loop 620 are satisfied. For instance, the termination criteria can comprise that a threshold number of updated responses have been provided to the user and that the user has responded with feedback that all of the updated responses are incorrect. If the termination criteria are satisfied, operational flow skips to block 605 corresponding to failure of the feedback loop 620. Otherwise, operational flow proceeds to block 604.

At block 604, the feedback/evaluation system updates the prompt to the LLM to include the user feedback and prompts the LLM with the updated prompt to obtain an updated response. The prompt comprises the prompt used to generate the most recent response presented to the user, possibly with prior user feedback removed when present. The updated prompt comprises task instructions to correct the most recently presented response according to the user feedback. The feedback/evaluation system provides the updated response to the user and operational flow returns to block 601 to wait for the user to respond with additional feedback.

At block 605, the feedback/evaluation system notifies the user that a response to the user query is not available, for instance as described at block 506 in reference to FIG. 5. Operational flow skips to block 614.

At block 606, the feedback/evaluation system generates a semantic embedding(s) of the user query. The semantic embedding(s) is generated according to types of semantic embeddings stored by the knowledge base for indexing.

At block 608, the feedback/evaluation system determines whether there are one or more entries in the knowledge base that are semantically similar to the generated semantic embedding(s) for the user query. For instance, the feedback/evaluation system can query the knowledge base for entries with query embeddings within a threshold semantic similarity. If the feedback/evaluation system determines there are one or more semantically similar embeddings returned by the knowledge base, operational flow proceeds to block 610. Otherwise, operational flow proceeds to block 612. Semantic similarity is described for query embeddings. In embodiments where the knowledge base is indexed with embeddings for both queries and query-response pairs (or responses), semantic similarity can be for both queries and responses when updating the knowledge base.

At block 610, the feedback/evaluation system updates an entry in the knowledge base comprising the user query, the correct response, and the generated embedding. The feedback/evaluation system replaces the most semantically similar entry with the user query and the corrected response indexed by the generated embedding.

At block 612, the feedback/evaluation system adds an entry to the knowledge base comprising the user query, the correct response, and the generated embedding. Updating and/or adding entries to the knowledge base using responses corrected with user feedback augments the knowledge base both by augmenting breadth of responses to queries of unstructured data and by incorporating domain-level knowledge incorporated into the user feedback and correct responses.

At block 614, the feedback/evaluation system adjusts a temperature parameter of the LLM based on the user feedback if any was received. The temperature parameter determines the amount of randomness used by the LLM when generating responses to user queries. When the feedback loop 620 comprised many iterations of user feedback and/or when the feedback loop 620 was a failure, the feedback/evaluation system can increase the temperature parameters to allow the LLM to seek more diverse responses. Conversely, when the feedback loop 620 was successful and/or comprised few iterations, the feedback/evaluation system can lower the temperature to allow the LLM to make more deterministic responses based on prior quality of responses provided by the LLM.

Figure 7:
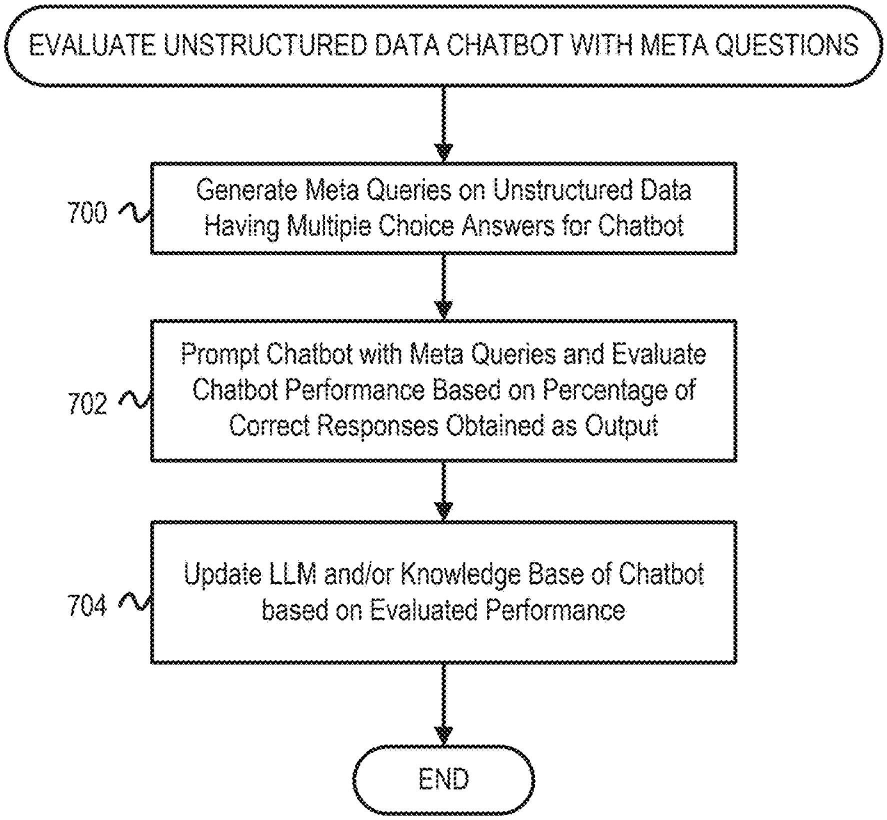
FIG. 7 is a flowchart of example operations for evaluating an unstructured data chatbot with meta questions.

FIG. 7 is a flowchart of example operations for evaluating an unstructured data chatbot with meta questions. Although depicted in reference to an unstructured data chatbot, the operations in FIG. 7 can be applied to evaluating any type of chatbot based on context of queries for which the chatbot is configured to respond (queries for natural language content of unstructured data in this instance).

At block 700, the feedback/evaluation system generates meta queries on unstructured data having multiple-choice answers for the chatbot. Each of the meta queries comprises instructions to choose one of multiple choices to a natural language question, and the answer relies on context of responses in query-response pairs for the unstructured data. The context can be context across multiple topics and multiple responses. For instance, the meta queries can be queries that combine context for multiple products/services associated with the unstructured data and how they interact with one another. The meta queries can be generated by a domain-level expert based on query-response pairs for the unstructured data stored in a knowledge base.

At block 702, the feedback/evaluation system prompts the chatbot with the meta queries and evaluates performance of the chatbot based on a percentage of correct responses obtained as output from the chatbot. Using percentage of correct responses from meta queries as a metric of performance for the chatbot allows the feedback/evaluation system to determine how well the chatbot has learned overall context of the unstructured data, and how well the chatbot can synthesize multiple contexts to generate quality responses. This is in contrast to evaluating quality of the chatbot by querying the chatbot with queries in query-response pairs stored in the knowledge base and comparing responses provided by the chat bot with responses in the knowledge base. The latter type of evaluation relies on semantic similarity of responses which is not always an accurate metric of whether the chatbot understands context of queries. Rather, comparing semantic similarity of responses determines whether the chatbot responds in a manner specifically prescribed by the query-response pairs.

At block 704, the feedback/evaluation system updates the LLM and/or knowledge base of the chatbot based on the evaluated performance. For instance, when the percentage of correct responses to the meta queries by the chatbot is below a threshold percentage, the feedback/evaluation system can generate additional entries for the knowledge base by mining additional unstructured data, can improve the LLM by choosing a more heavyweight LLM, tuning the LLM with context of the unstructured data, reengineering prompts to the LLM, etc.

Variations

The present disclosure refers variously to prompts of language models. A prompt for a language model can alternatively comprise any input sequence to the language model that elicits a corresponding output. Any instructions included in prompts/input sequences can alternatively be referred to as "task instructions" to distinguish from generic instructions executed by a hardware or software component. Any of the various operations for generating prompts/input sequences via inserting query-response pairs into engineered prompt templates can alternatively be referred to as "augmenting" prompts with the query-response pairs.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in in FIG. 5 can be performed in parallel or concurrently across user queries from multiple users with a same chatbot running on the backend. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
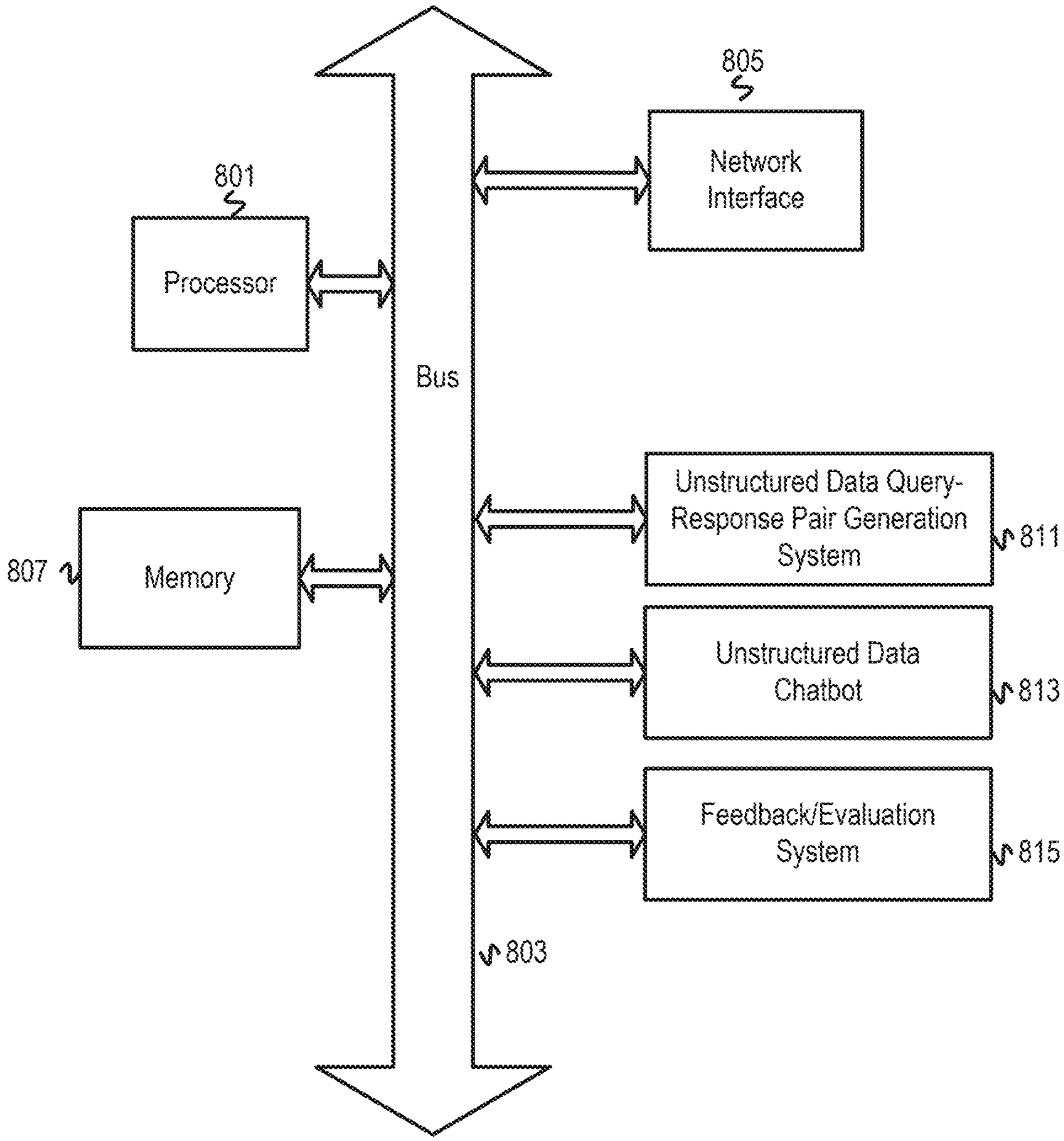
FIG. 8 depicts an example computer system with an unstructured data query-response pair generation system, an unstructured data chatbot, and a feedback/evaluation system.

FIG. 8 depicts an example computer system with an unstructured data query-response pair generation system, an unstructured data chatbot, and a feedback/evaluation system. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes an unstructured query-response pair generation system (generation system) 811, an unstructured data chatbot (chatbot) 813, and a feedback/evaluation system 815. The generation system 811 extracts text from unstructured data and prompts a first LLM to generate query-response pairs for natural language content in the unstructured data. The generation system 811 then generates query embeddings for queries in the query-response pairs and stores the query-response pairs in a knowledge base indexed by query embeddings. When the chatbot 813 receives a user query for natural language content of the unstructured data, the chatbot 813 prompts a second LLM with task instructions to generate a response to the user query based on context provided by query-response pairs stored in the knowledge base having semantically similar queries to the user query. The feedback/evaluation system 815 corrects responses based on user feedback, updates the knowledge base and/or LLMs with corrected responses based on the feedback, and evaluates the LLMs with meta queries. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

generating a first input sequence comprising first task instructions to generate query-response pairs based on context provided by text extracted from unstructured data, wherein each query-response pair comprises a query for natural language content in the unstructured data and a corresponding response to the query;

prompting a first language model with the first input sequence to obtain a plurality of query-response pairs;

based on receiving a query from a user for content in the unstructured data, augmenting a second input sequence instructing a second language model on how to respond to the query from the user, wherein the second input sequence comprises second task instructions to respond to the query based, at least in part, on context provided by one or more of the plurality of query-response pairs;

prompting the second language model with the augmented second input sequence to obtain a response to the user query; and based on feedback from the user indicating that the response is incorrect, invoking a feedback loop with the user to correct the response, wherein the feedback loop continues until current feedback from the user indicates that a current response obtained from the second language model at a current iteration of the feedback loop is correct or one or more termination criteria are satisfied, wherein the current iteration of the feedback loop comprises, prompting the second language model with an updated input sequence comprising the current feedback to generate an updated response to the query at a subsequent iteration of the feedback loop, and based on the current feedback from the user indicating that the current response is correct, terminating the feedback loop and updating the plurality of query response pairs with the query and the current response; and adjusting a temperature parameter of the second language model based on the feedback loop, wherein adjusting the temperature parameter comprises increasing the temperature parameter when the feedback loop failed and decreasing the temperature parameter when the feedback loop succeeded.

2. The method of claim 1, further comprising:

retrieving, from a database of query-response pairs indexed by embeddings of the queries in the query-response pairs, a set of one or more query-response pairs that satisfy a semantic similarity threshold with respect to the user query, wherein the set of one or more query-response pairs that satisfy the semantic similarity threshold comprises the one or more of the plurality of query-response pairs;

generating the second input sequence using the one or more of the plurality of query-response pairs; and prompting the second language model with the second input sequence to obtain a response to the user query.

3. The method of claim 2, wherein the first and second language models comprise large language models.

4. The method of claim 3, wherein the second language model comprises a lightweight large language model.

5. The method of claim 2, further comprising:

storing the plurality of query-response pairs as stored query-response pairs; and at least one of updating and replacing stored query-response pairs based, at least in part, on feedback from the user that the response is incorrect.

6. The method of claim 1, wherein the first task instructions comprise example topics for responses to user queries.

7. The method of claim 1, wherein generating the first input sequence comprises, extracting the text from the unstructured data according to sections indicated by the unstructured data; and inserting the text into the first task instructions with indications of each section.

8. The method of claim 2, wherein the updated input sequence at the current iteration of the feedback loop indicates the temperature parameter.

9. A non-transitory machine-readable medium having program code stored thereon, the program code comprising instructions to:

based on receiving a query from a user for natural language content in unstructured data, retrieve one or more query-response pairs from a plurality of query-response pairs corresponding to queries for natural language content in the unstructured data, wherein the one or more query-response pairs comprise those of the plurality of query-response pairs with corresponding queries having highest semantic similarity to the query from the user;

generate a first input sequence comprising first task instructions to generate a response to the user query based on context provided by the one or more query-response pairs;

prompt a first language model with the first input sequence to obtain a response to the user query as output; and based on feedback from the user indicating that the response is incorrect, invoke a feedback loop with the user to correct the response, wherein the feedback loop continues until current feedback from the user indicates that a current response obtained from the first language model at a current iteration of the feedback loop is correct or one or more termination criteria are satisfied, wherein the current iteration of the feedback loop comprises instructions to, prompt the first language model with an updated input sequence comprising the current feedback to generate an updated response to the query at a subsequent iteration of the feedback loop, and based on the current feedback from the user indicating that the current response is correct, terminate the feedback loop and update the plurality of query-response pairs with the query and the current response; and adjusting a temperature parameter of the second language model based on the feedback loop, wherein adjusting the temperature parameter comprises increasing the temperature parameter when the feedback loop failed and decreasing the temperature parameter when the feedback loop succeeded.

10. The non-transitory machine-readable medium of claim 9, wherein the program code further comprises instructions to:

generate a second input sequence comprising second task instructions to generate query-response pairs based on context provided by text extracted from the unstructured data, wherein each query-response pair comprises a query for natural language content in the unstructured data and a corresponding response to the query; and prompting a second language model with the second input sequence to obtain the plurality of query-response pairs as output.

11. The non-transitory machine-readable medium of claim 10, wherein the first and second language models comprise large language models.

12. The non-transitory machine-readable medium of claim 11, wherein the second language model comprises a lightweight large language model.

13. The non-transitory machine-readable medium of claim 10, wherein the program code further comprises instructions to:

store the plurality of query-response pairs as stored query-response pairs; and at least one of update and replace stored query-response pairs based, at least in part, on feedback from the user that the response is incorrect.

14. The non-transitory machine-readable medium of claim 13, wherein the program code to store the plurality of query-response pairs comprises instructions to store the plurality of query-response pairs indexed by corresponding embeddings, wherein semantic similarity between the query of the user and the plurality of query-response pairs comprises semantic similarity between an embedding of the query of the user and embeddings of queries in the plurality of query-response pairs.

15. The non-transitory machine-readable medium of claim 9, wherein the updated input sequence at the current iteration of the feedback loop indicates the temperature parameter.

16. An apparatus comprising:

a processor; and a machine-readable medium having instructions stored thereon that are executable by the processor to cause the apparatus to, generate a first input sequence comprising first task instructions to generate query-response pairs based on context provided by text extracted from unstructured data, wherein each query-response pair comprises a query for natural language content in the unstructured data and a corresponding response to the query;

prompt a first language model with the first input sequence to obtain a plurality of query-response pairs as output;

based on receiving a query from a user for content in the unstructured data, augment a second input sequence instructing a second language model on how to respond to the query from the user, wherein the second input sequence comprises second task instructions to respond to the query based, at least in part, on context provided by one or more of the plurality of query-response pairs prompt the second language model with the augmented second input sequence to obtain a response to the user query; and based on feedback from the user indicating that the response is incorrect, invoke a feedback loop with the user to correct the response, wherein the feedback loop continues until current feedback from the user indicates that a current response obtained from the second language model at a current iteration of the feedback loop is correct or one or more termination criteria are satisfied, wherein the current iteration of the feedback loop comprises instructions executable by the processor to cause the apparatus to, prompt the second language model with an updated input sequence comprising the current feedback to generate an updated response to the query at a subsequent iteration of the feedback loop, and based on the current feedback from the user indicating that the current response is correct, terminate the feedback loop and update the plurality of query-response pairs with the query and the current response; and adjusting a temperature parameter of the second language model based on the feedback loop, wherein adjusting the temperature parameter comprises increasing the temperature parameter when the feedback loop failed and decreasing the temperature parameter when the feedback loop succeeded.

17. The apparatus of claim 16, wherein the first and second language models comprise large language models.

18. The apparatus of claim 17, wherein the second language model comprises a lightweight large language model.

19. The apparatus of claim 16, wherein the updated input sequence at the current iteration of the feedback loop indicates the temperature parameter.

20. The apparatus of claim 16, wherein the machine-readable medium further has stored thereon instructions executable by the processor to cause the apparatus to: store the plurality of query-response pairs as stored query-response pairs; and at least one of update and replace stored query-response pairs based, at least in part, on feedback from the user that the response is incorrect.

* * * * *